United States Patent
Fesseler et al.

[11] Patent Number: 5,303,346
[45] Date of Patent: Apr. 12, 1994

[54] METHOD OF CODING 32-KB/S AUDIO SIGNALS

[75] Inventors: Peter Fesseler, Stuttgart; Gebhard Thierer, Ditzingen, both of Fed. Rep. of Germany

[73] Assignee: Alcatel N.V., Amsterdam, Netherlands

[21] Appl. No.: 924,922

[22] Filed: Aug. 5, 1992

[30] Foreign Application Priority Data

Aug. 12, 1991 [DE] Fed. Rep. of Germany ....... 4126581
Apr. 13, 1992 [DE] Fed. Rep. of Germany ....... 4212339

[51] Int. Cl.$^5$ ............................................. G10L 9/02
[52] U.S. Cl. ................................... 395/2.39; 395/2.12
[58] Field of Search ................................ 381/29–53, 381/106; 395/2.39, 2.12

[56] References Cited

U.S. PATENT DOCUMENTS

| | | | |
|---|---|---|---|
| 5,040,217 | 8/1991 | Brandenburg et al. | 381/47 |
| 5,109,417 | 4/1992 | Fielder et al. | 381/29 |
| 5,199,078 | 3/1993 | Orgimeister | 381/47 |

Primary Examiner—Michael R. Fleming
Assistant Examiner—Michelle Doerrler
Attorney, Agent, or Firm—Spencer, Frank & Schneider

[57] ABSTRACT

Coding digitized audio signals includes dividing an audio signal, consisting of a continuous sequence of sample values, into successive blocks of equal length, and performing overlapping windowing. The blocks are transformed into complex Fourier coefficients by means of a discrete Fourier transform, which complex Fourier coefficients are decomposed into magnitude values and phase values. The phase values are quantized with a linear quantization characteristic which becomes coarser going from low toward high frequencies. The magnitude values are combined into frequency bands which are oriented with regard to predetermined critical bands and become wider toward high frequencies. Quantization levels for each frequency band are fixed, taking into account a lower, frequency-dependent, absolute threshold of hearing, such that a range lying below the respective threshold of hearing is disregarded, and taking into account a relative threshold of hearing, such that ranges in the neighborhood of frequencies with large magnitude values are taken into account to a reduced extent. A number of sub-bands consisting of single values of the frequency bands are fixed, and the greatest single magnitude value of each sub-band is determined. Variable quantization of each frequency band is performed by quantizing the greatest magnitude value of a sub-band with a maximum available number of bits and all other magnitude values with a smaller number of bits.

9 Claims, 2 Drawing Sheets

METHOD OF CODING 32-KB/S AUDIO SIGNALS

BACKGROUND OF THE INVENTION

1. Field of the Invention

The invention relates to digital coding of audio signals, in particular for producing 32 Kb/s data useful in telecommunications applications.

2. Background Information

In telecommunications, signals are nowadays mostly transmitted in digital form.

To meet the increasing need for connections with existing line capacities necessitates decreasing bit rates with unchanged intelligibility.

For good intelligibility, e.g., during hands-free operation or in video conferences, the present bandwidth of 300 to 3400 Hz at 64 kbs is already insufficient. The goal is to achieve good speech quality (also for music signals) for future bandwidths of 50 to 7000 Hz with a simultaneous reduction of the data rate to 32 kbs.

A coding technique for wideband (0 to 20 kHz) signals is known (R. Orglmeister, "Transformationscodierung mit fester Bitzuteilung bei Audiosignalen", FREQUENZ 44 (1990) 9-10, pp. 226-232) in which a sequence of sample values (44.1-kHz sampling with 16 bits per sample value) is first divided into blocks of equal size and processed by overtapping windowing (rectangular cosine function) to suppress audible block-boundary effects.

The signal is then transformed into the frequency domain by means of a first Fourier transform and decomposed into magnitude and phase values.

The phase values are uniformly quantized, while the magnitude values are subjected to data reduction.

For the data reduction, magnitude groups are formed such that, instead of the individual magnitude values, only the geometric mean of all magnitudes of a group is transmitted.

These magnitude groups are then routed, according to frequency range, to five different quantizers which quantize nonuniformly, approximating the logarithmic loudness perception.

By this known method, good speech quality is achieved, but due to insufficient data reduction of the magnitude values, a data rate of 32 kbs is not attainable.

SUMMARY OF THE INVENTION

It is the object of the invention to implement a coding method with a considerably higher data reduction and unchanged speech quality, particularly for audio signals with a bandwidth up to 7000 Hz at a data rate of 32 kbs. A method of coding digitized audio signals including the steps of dividing an audio signal, consisting of a continuous sequence of sample values, into successive blocks of equal length, and performing overlapping windowing; transforming the blocks into complex Fourier coefficients by means of a discrete Fourier transform; decomposing the complex Fourier coefficients into magnitude values and phase values; quantizing the phase values with a linear quantization characteristic which becomes coarser going from low toward high frequencies; combining the magnitude values into frequency bands which are oriented with regard to predetermined critical bands and become wider toward high frequencies; fixing quantization levels for each frequency band, taking into account a lower, frequency-dependent, absolute threshold of hearing, such that a range lying below the respective threshold of hearing is disregarded, and taking into account a relative threshold of hearing, such that ranges in the neighborhood of frequencies with large magnitude values are taken into account to a reduced extent; fixing a number of sub-bands consisting of single values of the frequency bands, and determining the greatest single magnitude value of each sub-band; and performing variable quantization of each frequency band by quantizing the greatest magnitude value of a sub-band with a maximum available number of bits and all other magnitude values with a smaller number of bits.

In particular, a substantial data reduction of the magnitude values of the coefficients obtained by a discrete Fourier transform and decomposed in magnitude and phase is achieved by taking into account the absolute threshold of hearing and a relative threshold of hearing, known as "masking effect", in fixing the quantization levels, and by a subsequent variable quantization.

Another solution according to the invention, after decomposition of the complex coefficients into magnitude and phase values, first takes into account the relative threshold of hearing, i.e., the masking effect, then divides the magnitude values into frequency bands, and takes into account the absolute threshold of hearing. For the values lying below the thresholds, the value zero is used for the magnitude, and the bits for the associated phase values are saved and used for the nonzero magnitude and phase values.

BRIEF DESCRIPTION OF THE DRAWINGS

Further advantageous features of the subject matter of the invention will become apparent from the detailed description taken with the drawings in which.

DETAILED DESCRIPTION OF THE PREFERRED EMBODIMENTS

Two embodiments of the invention will now be explained with reference to the flowcharts shown in the accompanying drawings.

In both cases (FIGS. 1 and 2), the signal to be coded is an audio signal sampled at 16 kHz, quantized with 16 bits, and band-limited to 50-7000 Hz.

In the time domain, this continuous sequence of sample values is divided into blocks of equal length (here 256 values), and overtapping windowing is performed with the aid of a rectangular cosine function (step (1) in the figures). This overtapping windowing, which is known per se, suppresses audible block-boundary effects.

This is followed by a transformation of the blocks by means of a discrete Fourier transform, particularly a fast Fourier transform FFT (step (2)), together with a conventional block normalization.

The resulting 256 conjugate complex coefficients per block are then decomposed into magnitude and phase values (step (3)) in order to subsequently perform separate quantization.

Since the resolution of the human ear decreases with increasing frequency, higher frequencies can be quantized much more coarsely than low frequencies.

Figure 1:
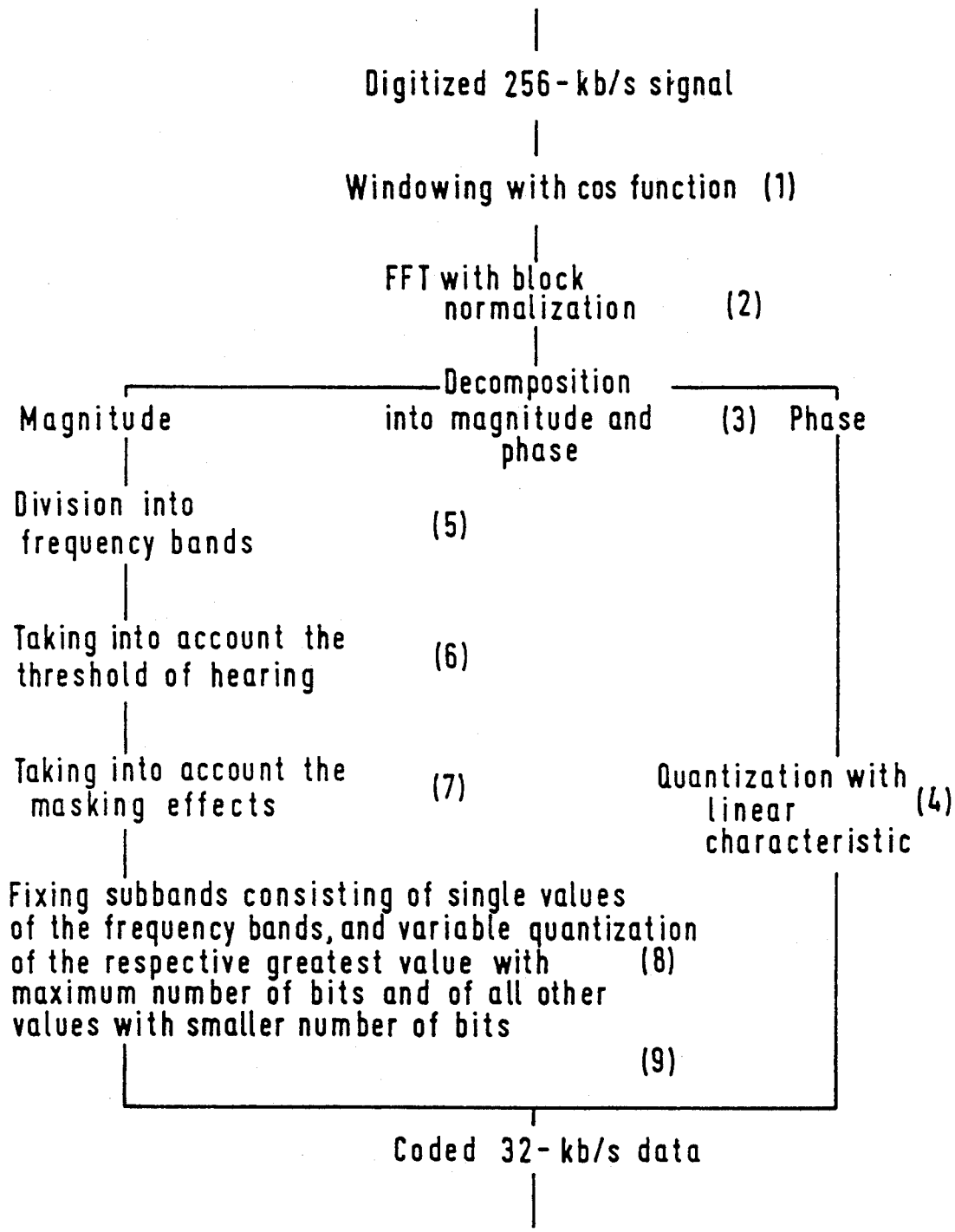
FIG. 1 depicts the method according to a first embodiment.

Therefore, the phase values (step (4) in FIG. 1), here 128 values, since only one half of the 256 conjugate complex values is relevant for reasons of symmetry, are quantized in accordance with a linear quantization characteristic, beginning with preferably 5 bits for the lowest frequency and decreasing to 2 bits for the highest frequency.

For data reduction, according to the invention, the magnitude values are considerably compressed.

To this end, the magnitude values are divided into frequency bands (step (5) in FIG. 1), which are oriented with regard to critical bands, and become wider toward higher frequencies. The principle of critical bands is known, for example, from "Subdivision of the Audible Frequency Range into Critical Bands (Frequenzgruppen)", by E. Zwicker, The Journal of Acoustical Society of America, Vol. 33, No. 2, Feb. 1961, page 248.

For such a magnitude-group formation, instead of the individual magnitude values of the spectral lines, only the geometric mean of all magnitudes of a band is computed.

The magnitude-group formation chosen here permits a reduction from initially 128 magnitudes (here, too, only one half of the 256 conjugate complex values is used) to 58 frequency bands. For the lowest frequency range (magnitude group 0 to 31), all magnitude values are used, forming 32 frequency bands; for the subsequent frequency range (magnitudes 32 to 60), every two adjacent magnitude values are combined, forming 14 frequency bands; for the next frequency range (magnitudes 60 to 104), every four magnitude values are combined, forming 11 frequency bands, and for the highest frequency range (magnitudes 104 to 112), every eight adjacent magnitude values are combined, forming 1 frequency band (magnitudes 112 to 127 are disregarded).

For a further data reduction of the frequency bands, quantization levels are fixed for each frequency band as a preliminary stage for the quantization.

According to the invention, advantage is taken of the fact that below a certain threshold which is frequency-dependent, i.e., below the so-called absolute threshold of hearing, the human ear has no perception although measurable signals are present. Therefore, this range below the threshold of hearing is disregarded for the quantization levels, so that the quantization levels can be optimized to form a better image of the audible range (step (6) in FIG. 1).

In addition, a relative threshold of hearing, which is based on the so-called masking effect, is taken into account. Due to this effect, low tones which lie in the immediate vicinity of a loud tone (large magnitude values) are covered, i.e., masked. Therefore, these masked frequencies are disregarded, too, or are only taken into account to a reduced extent (step (7) in FIG. 1).

Since the relative threshold of hearing is frequency-dependent, according to a further advantageous feature of the invention, weighting is introduced in order to assign greater weight to the respective threshold having the greater magnitude.

With the aid of the quantization levels thus chosen, a variable quantization of the frequency bands is then carried out (steps (8,9) of FIG. 1).

To do this, the frequency bands are first divided into a predeterminable number of sub-bands, here approximately 15, consisting of single values, and the greatest single value of each sub-band is determined. The greatest magnitude value is then quantized with the maximum number of bits available, while all other magnitude values are quantized with a smaller number of bits.

For the low frequency range, for example, the greatest magnitude value is quantized with 7 bits and the other values with 5 bits, and for high frequency ranges, a quantization from 5 bits to 3 bits is performed.

The magnitude and phase values thus coded are then transmitted at 32 kbs. At the opposite end, decoding can then take place in an analogous mode.

Figure 2:
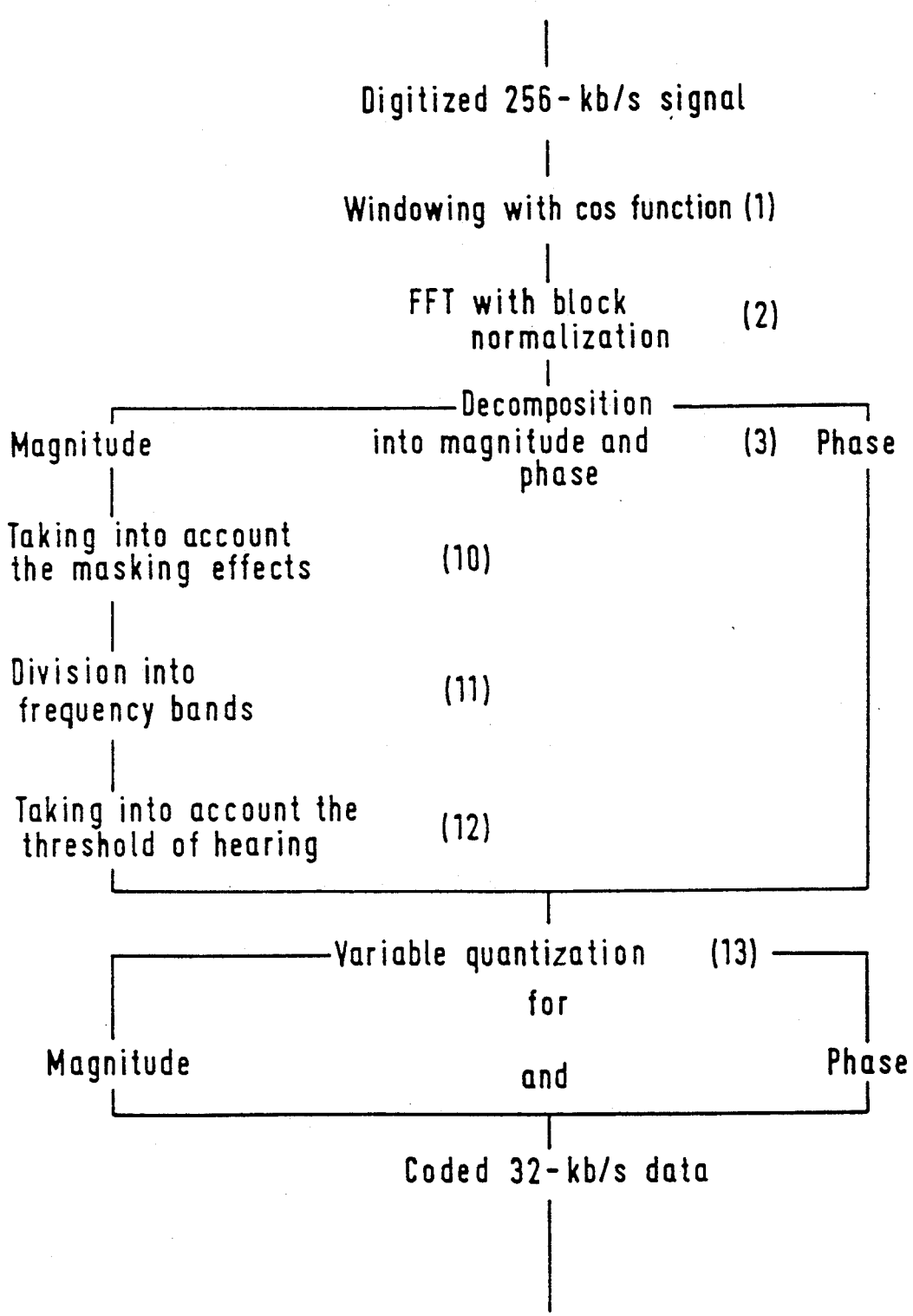
FIG. 2 depicts a method according to a second embodiment.

In a further solution according to the invention, after decomposition into magnitude and phase in step (3), the relative threshold of hearing is taken into account, as shown in FIG. 2. Those magnitude values of coefficients which lie in the neighborhood of frequency lines with great magnitude values are fully taken into account or disregarded (step 10).

In step 11, analogously to step (5) of FIG. 1, the magnitude values are again divided into frequency bands (e.g., approx. 60 groups). With increasing frequency, a greater number of values is grouped into one band.

In step (12), analogously to step (6) of FIG. 1, the absolute threshold of hearing is taken into account, with the quantization levels being fixed for each frequency band in such a way that the magnitude values of a band are divided by a frequency-dependent factor specifying the absolute threshold of hearing.

In the following step (13), a variable quantization of the magnitude and phase values is carried out with a quantization characteristic becoming coarser going from low toward high frequencies, allowing for the fact that in certain cases, the magnitude values must not be taken into account, i.e., they are assigned the value zero.

That is the case if magnitude values lie below the relative threshold of hearing or below the absolute threshold of hearing. Then it is sufficient to transmit the magnitude value zero and to disregard the associated phase values, i.e., not to use any bits for the quantization of these phase values.

According to the invention, the bits thus "saved" are used for the nonzero magnitude and phase values to be quantized.

According to a further advantageous aspect of the invention, a so-called spectral roughness can be determined for the magnitude values divided into frequency bands. This allows for the fact that instruments, such as violins, or voices may have a great number of higher harmonics which are contained in particular higher frequencies. If, as described in step (5) of FIG. 1, the geometric mean of all magnitude values of a band were used, unacceptable distortions would occur. Therefore, the quotient of each magnitude value and the geometric mean of a band is formed as a measure of the spectral roughness. If the maximum magnitude value of a band exceeds the geometric mean by a predetermined factor, preferably by the factor 2, only the maximum magnitude value will be taken into account and the other magnitude values of the band will be set equal to zero.

Otherwise, the geometric mean will be used, as in step (5) of FIG. 1.

If the maximum magnitude value is used, only a value of zero will again be transmitted for the magnitude values set equal to zero, and the associated phase values will not be quantized. The bits thus "saved" can advantageously be employed for the nonzero magnitude and phase values.

Since the human ear perceives lower frequencies better than higher frequencies, the quantization of the magnitude and phase values begins with 4 bits and 3 bits, respectively, for the lower frequencies and uses only 3 bits and 2 bits, respectively, for the higher frequencies.

The above-described coding methods according to the invention permit a real-time implementation of a coder/decoder with a single 32-kbs digital signal processor,

We claim:

1. A method of coding digitized audio signals, comprising the steps of:
dividing an audio signal, consisting of a continuous sequence of sample values, into successive blocks of equal length, and performing overlapping windowing;
transforming the blocks into complex Fourier coefficients by means of a discrete Fourier transform;
decomposing the complex Fourier coefficients into magnitude values and phase values;
quantizing the phase values with a linear quantization characteristic which becomes coarser going from low toward high frequencies;
combining the magnitude values into frequency bands which are oriented with regard to predetermined critical bands and become wider toward high frequencies;
fixing quantization levels for each frequency band, taking into account a frequency-dependent, absolute threshold of hearing, such that a frequency range lying below the respective frequency-dependent, absolute threshold of hearing is disregarded, and taking into account a relative threshold of hearing, such that frequency ranges in the immediate vicinity of frequencies with large magnitude values are taken into account to a reduced extent;
fixing a number of sub-bands consisting of single values of the frequency bands, and determining the greatest single magnitude value of each sub-band, and
performing variable quantization of each frequency band by quantizing the greatest magnitude value of a sub-band with a maximum available number of bits and all other magnitude values with a smaller number of bits.

2. A method as claimed in claim 1, wherein the step of dividing the audio signal into blocks and performing windowing comprises:
dividing the continuous sequence of sample values into blocks of 256 values, and
using a rectangular cosine function for the overlapping windowing.

3. A method as claimed in claim 2, wherein the step of quantizing the phase values comprises:
quantizing the phase values, beginning with 5 bits for the lowest frequency and linearly decreasing down to 2 bits for the highest frequency.

4. A method as claimed in claim 1, wherein the step of quantizing the phase values comprises:
quantizing the phase values, beginning with 5 bits for the lowest frequency and linearly decreasing down to 2 bits for the highest frequency.

5. A method as claimed in claim 1, wherein the step of fixing quantization levels comprises:
weighting the lower threshold of hearing and the relative threshold of hearing to fix the quantization levels, such that the threshold having the greater magnitude value is assigned a greater weight.

6. A method of coding digitized audio signals, comprising the steps of:
dividing an audio signal, consisting of a continuous sequence of sample values, into successive blocks of equal length, and performing overlapping windowing;
transforming the blocks into complex Fourier coefficients by means of a discrete Fourier transform;
decomposing the complex Fourier coefficients into magnitude values and phase values;
taking into account a relative threshold of hearing, such that those magnitude values of coefficients which lie in the immediate vicinity of frequency lines with large magnitude values are either fully taken into account or disregarded;
dividing the magnitude values into frequency bands which are oriented with regard to critical bands and become wider toward high frequencies;
fixing quantization levels for each frequency band, taking into account a frequency-dependent, absolute threshold of hearing, such that a range of frequencies lying below the respective frequency-dependent, absolute threshold of hearing is disregarded, and
performing variable quantization of the magnitude and phase values with a quantization characteristic which becomes coarser going from low toward high frequencies, with the value zero being quantized for those magnitude values of coefficients which lie below the relative threshold of hearing or below the absolute threshold of hearing, no value being quantized for the associated phase values, whereby the bits not needed for said associated phase values are used for a more accurate quantization of the nonzero magnitude and phase values.

7. A method as claimed in claim 6, further comprising the steps of:
determining a spectral roughness for the magnitude values grouped into frequency bands by forming a quotient of each magnitude value and a geometric mean of the respective frequency band, and
if a maximum magnitude value in a respective frequency band exceeds the geometric mean by a predetermined factor, taking into account only this maximum magnitude value and the position of this maximum magnitude value within the respective frequency band, and if the maximum magnitude value in a respective frequency band does not exceed the geometric means by the predetermined factor, taking into account a value representative of the geometric mean of all magnitude values in the frequency band.

8. A method as claimed in claim 7, further comprising the steps of:
if only the maximum magnitude value of a frequency band is taken into account, taking into account the value zero for all other magnitude values of the frequency band, and
using bits not needed for associated phase values for the nonzero magnitude and phase values.

9. A method as claimed in claim 7, wherein:
a value of 2 is used as the predeterminable factor.

* * * * *